(12) United States Patent
Huh et al.

(10) Patent No.: US 7,556,118 B2
(45) Date of Patent: Jul. 7, 2009

(54) AIRBAG SYSTEM FOR AN AUTOMOBILE AND METHOD OF OPERATING THE SAME

(75) Inventors: Hoon Huh, Daejeon (KR); Sang Soon Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 149 days.

(21) Appl. No.: 11/668,118

(22) Filed: Jan. 29, 2007

(65) Prior Publication Data
US 2007/0235996 A1  Oct. 11, 2007

(30) Foreign Application Priority Data
Apr. 10, 2006  (KR) .................. 10-2006-0032425

(51) Int. Cl.
*B60R 21/01* (2006.01)
(52) U.S. Cl. .................. 180/274; 180/268; 180/271; 180/282; 280/730.1; 280/735; 296/187.03; 296/187.09; 296/187.11; 701/45
(58) Field of Classification Search .......... 280/735, 280/730.2, 730.1; 180/268, 274, 282; 296/187.03, 296/187.09; 701/45
See application file for complete search history.

(56) References Cited

U.S. PATENT DOCUMENTS

| | | | |
|---|---|---|---|
| 3,974,350 A | 8/1976 | Breed | |
| 5,457,982 A * | 10/1995 | Spies et al. | 73/1.38 |
| 6,191,519 B1 * | 2/2001 | Nye et al. | 310/316.01 |
| 6,448,512 B1 * | 9/2002 | Cooper | 180/273 |
| 7,098,778 B1 * | 8/2006 | Zoratti et al. | 340/436 |
| 7,158,017 B2 * | 1/2007 | Baur et al. | 340/436 |
| 7,188,511 B2 * | 3/2007 | Stuetzler | 73/12.01 |
| 7,219,760 B2 * | 5/2007 | Wolfe et al. | 180/273 |
| 2005/0197753 A1 * | 9/2005 | Miura et al. | 701/45 |
| 2005/0209756 A1 * | 9/2005 | Ueno | 701/45 |
| 2006/0042396 A1 | 3/2006 | Qing et al. | |
| 2006/0229785 A1 | 10/2006 | Baur et al. | |

FOREIGN PATENT DOCUMENTS

DE  100 34 524 A1  1/2002

(Continued)

*Primary Examiner*—John Q. Nguyen
*Assistant Examiner*—James English
(74) *Attorney, Agent, or Firm*—Patterson, Thuente, Skaar & Christensen, P.A.

(57) ABSTRACT

The present invention may provide an airbag system for an automobile and a method of operating the same. The airbag system comprises the following: sensors mounted on a frame member of a the vehicle frame for detecting a crash by sequentially measuring stress wave cause by the crash; an electronic control unit for outputting an actuation signal based on outputs from the sensors; an inflator for generating a gas in response to the actuation signal; and an airbag operatively coupled to the inflator and being deployed by supply of the gas generated from the inflator. The sensors are mounted on the frame member at predetermined intervals in a path, along which the stress waves propagate through the frame member. The electronic control unit outputs the actuation signal when each output from each sensor exceeds a predetermined threshold. The airbag system can remarkably reduce the time required for detecting a crash by measuring the stress waves, which propagate very rapidly through the vehicle frame, thereby deploying the airbag in a timely manner.

6 Claims, 12 Drawing Sheets

FOREIGN PATENT DOCUMENTS

| | | | |
|---|---|---|---|
| DE | WO/2005/056346 | * | 6/2005 |
| EP | 1 604 870 A2 | | 12/2005 |
| JP | 2005-212662 | | 8/2005 |
| WO | WO 2005/056356 A2 | | 6/2005 |
| WO | WO 2005/056356 A3 | | 6/2005 |

* cited by examiner

AIRBAG SYSTEM FOR AN AUTOMOBILE AND METHOD OF OPERATING THE SAME

The present application claims priority from Korean Patent Application No. 10-2006-0032425 filed on Apr. 10, 2006, the entire subject matter of which is incorporated herein by reference.

BACKGROUND

1. Field

Embodiments of the present invention may relate to an airbag system for an automobile adapted to remarkably reduce the time required for detecting a crash by measuring the stress waves, which propagate very quickly through a vehicle frame after such crash to thereby deploy the airbag in a timely manner.

2. Background

An airbag system for an automobile generally comprises the following: a crash sensor for detecting a collision of the automobile; an airbag for protecting passengers from the collision; an inflator for generating gas and supplying it to the airbag; and an electronic control unit for actuating the inflator based on the signals from the crash sensor and diagnosing the airbag system.

Three types of crash sensors have been commonly used in order to detect automobile crashes. The first is an electromechanical crash sensor wherein an electrical circuit is closed by the movement of a sensing mass caused by the inertia thereof in the event of a collision. The second is an electronic crash sensor, which utilizes the unique features of an electronic circuitry such as memory and programmability, thereby implementing the criteria for identifying and discriminating signals in the event of a collision. The last is an all-mechanical crash sensor, wherein a firing pin is released so as to ignite an inflator when the impact caused by the collision is sufficiently high enough to rotate a trigger shaft beyond a predetermined magnitude. Among them, the electromechanical crash sensor has been widely used for the airbag system since its cost is relatively low and the airbag system can be fairly easily diagnosed.

FIGS. 1 and 2 are sectional views of a prior art ball-in-tube sensor 10, which is one example of the above-mentioned electromechanical crash sensor. This sensor is manufactured by Breed Automotive Corporation and includes a sensing-mass 15 such as a steel ball and a tube 14 as disclosed in U.S. Pat. No. 3,974,350.

A magnet 12, which is disposed at one end of the tube 14, attracts the sensing-mass 15 towards one end of the tube 14. Under regular driving or braking conditions (or even in minor collisions), the attractive force of the magnetic 12 prevents the sensing-mass 15 from moving. When a collision of greater magnitude occurs, the sensing-mass 15 can move away from its resting location. If the impact is sufficiently strong and lasts long enough for the sensing-mass 15 to touch the contact 13 disposed at the opposite end of the tube 14, then the sensing-mass 15 bridges two contacts 13 and thereby closes an electrical circuit. The circuit closure sends an electrical current to an inflator, thereby initiating the deployment of an airbag.

When the sensing-mass 15 moves within the tube 14, the air within the sensor flows from one side of the sensing-mass 15 to the other side through the clearance between the sensing-mass 15 and the tube 14. Such airflow generates a drag force that dampens the movement of the sensing-mass 15. The magnitude of the damping force depends primarily on the movement of the sensing-mass 15 and the tightness of the clearance. Other factors such as the amount of air behind the sensing-mass 15, pressure and temperature within the sensor also play a role in the damping phenomenon.

In the above-described ball-in-tube sensor 10, when the crash occurs, the sensing-mass 15 moves from the normal position adjacent the magnet 12 to the contacts 13 in response to the deceleration of the vehicle and against the attractive force of the magnet 12 and the drag force of the air. In such a case, it was found that it takes 10~20 ms to detect the crash by the electric-mechanical crash sensor such as the above-described sensor 10. It was also found that it takes 40~50 ms to fully deploy the airbag from the airbag system. Accordingly, there is a need to reduce the time required for detecting a crash so as to deploy the airbag in a timely manner.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skills in the art may realize that the following description is illustrative only and is not in any way limiting. Other embodiments of the present invention may readily suggest themselves to such skilled persons having the benefit of this disclosure.

Figure 1:
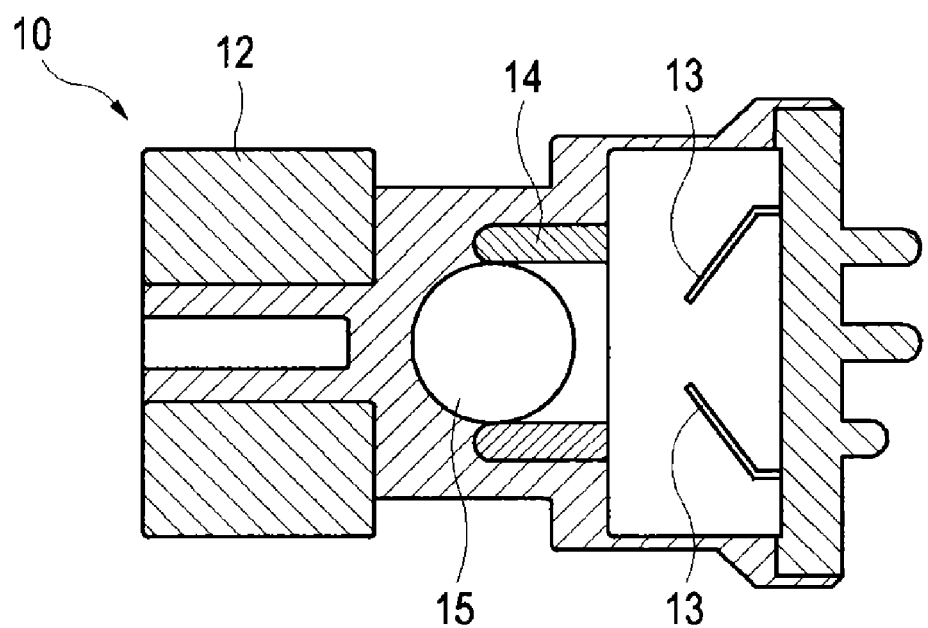
FIG. 1 is a sectional view of a prior art ball-in-tube sensor in an inactivated state.
Figure 2:
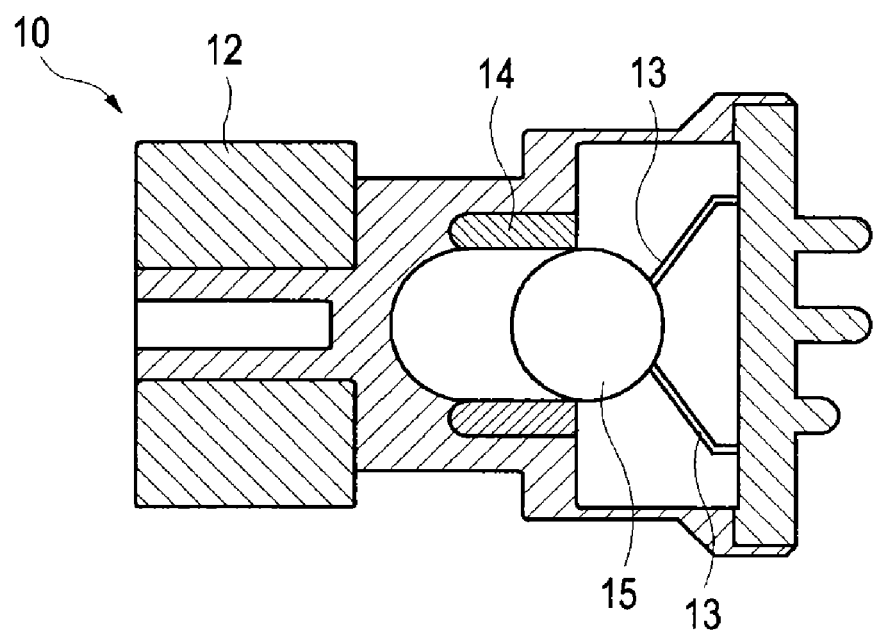
FIG. 2 is a sectional view of the prior art ball-in-tube sensor of FIG. 1 in an activated state.
Figure 3:
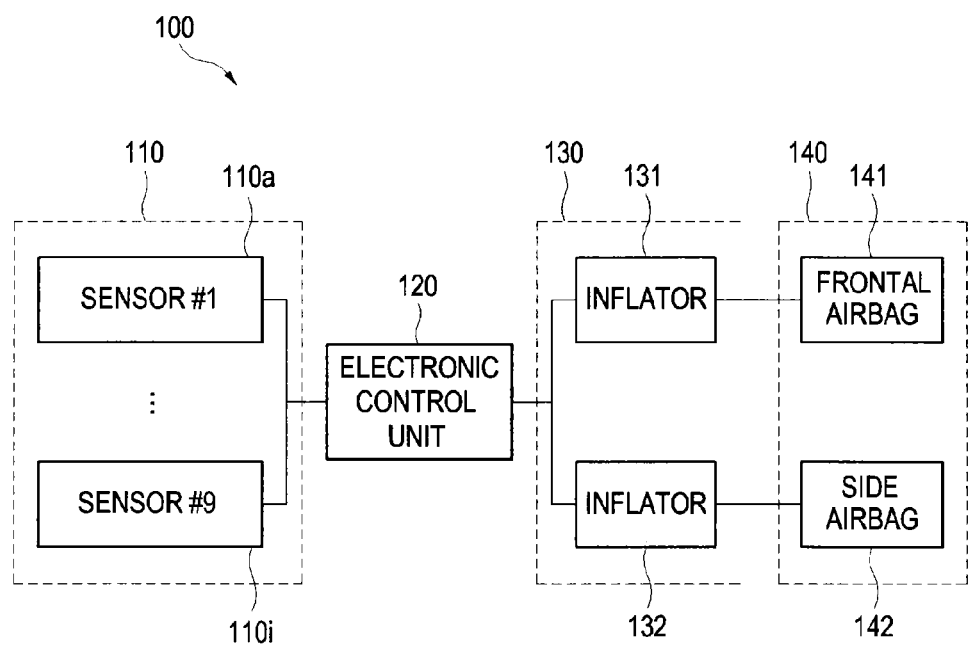
FIG. 3 is a schematic block diagram showing a constitution of an airbag system according to one example embodiment of the present invention.

FIG. 3 is a schematic block diagram showing a constitution of an airbag system according to one example embodiment of the present invention.

The airbag system 100, which is constructed according to one example embodiment of the present invention, is installed on an automobile equipped with a passenger protective device such as an inflatable airbag. When the vehicle is subjected to an impact over a predetermined threshold due to a crash, the airbag is inflated to provide a protective cushion for a driver or a passenger.

As shown in FIG. 3, the airbag system 100 may comprise: sensors 110 for detecting a crash; an electronic control unit (ECU) 120 for monitoring outputs from the sensors 110 to thereby output an actuation signal based on the outputs from the sensors 110; an inflator 130 for generating gas in response to the actuation signal from the ECU 130; and an airbag 140 operatively coupled to the inflator 130 and being deployed by supply of the gas generated from the inflator 130.

The airbag system 100 comprises sensors 110, which are configured to detect a crash. The sensors 110 measure the stress waves, which are generated by an impact applied to the vehicle frame or body in the event of a crash and propagate through the vehicle frame.

The sensors 110 are mounted on a frame member of the vehicle frame such that they are placed at predetermined intervals in a path, along which the stress waves propagate without dispersion after being generated by the crash. Preferably, two or more sensors 110 are mounted on the frame member. By doing so, the stress waves are measured sequentially at predetermined time intervals as they propagate from a collision or impact point toward the inside of the vehicle. Thereafter, the output from each sensor 110 is sent to the ECU 120, which determines whether to deploy the airbag 140.

The sensor 110 may include any type of sensor capable of measuring or detecting the stress waves propagating through any metallic member similar to the frame members of the vehicle frame. Preferably, the sensor 110 includes a strain gauge sensor or a piezoelectric strain sensor. The strain gauge sensor can measure strain or stress based on changes in electric resistance caused by an infinitesimal deformation of any member having the strain gauge sensor thereon when the stress waves propagate through the member. Further, the piezoelectric strain sensor can measure strain or stress based on a piezoelectric effect caused by an infinitesimal deformation of any member having the piezoelectric strain sensor thereon when the stress waves propagate through the member.

Figure 4:
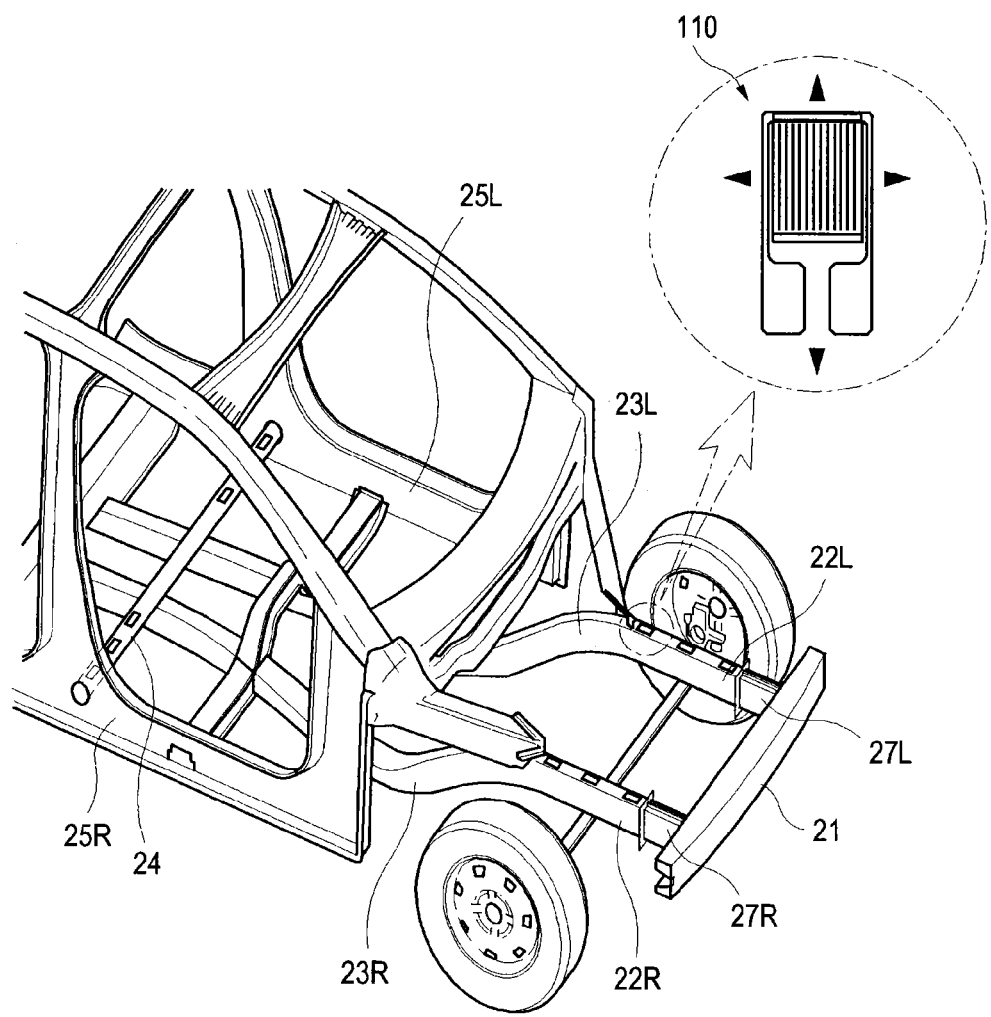
FIGS. 4 and 5 are schematic diagrams showing sensors of the airbag system according to one example embodiment of the present invention and various parts of a vehicle frame on which the sensors are mounted, respectively.
Figure 5:
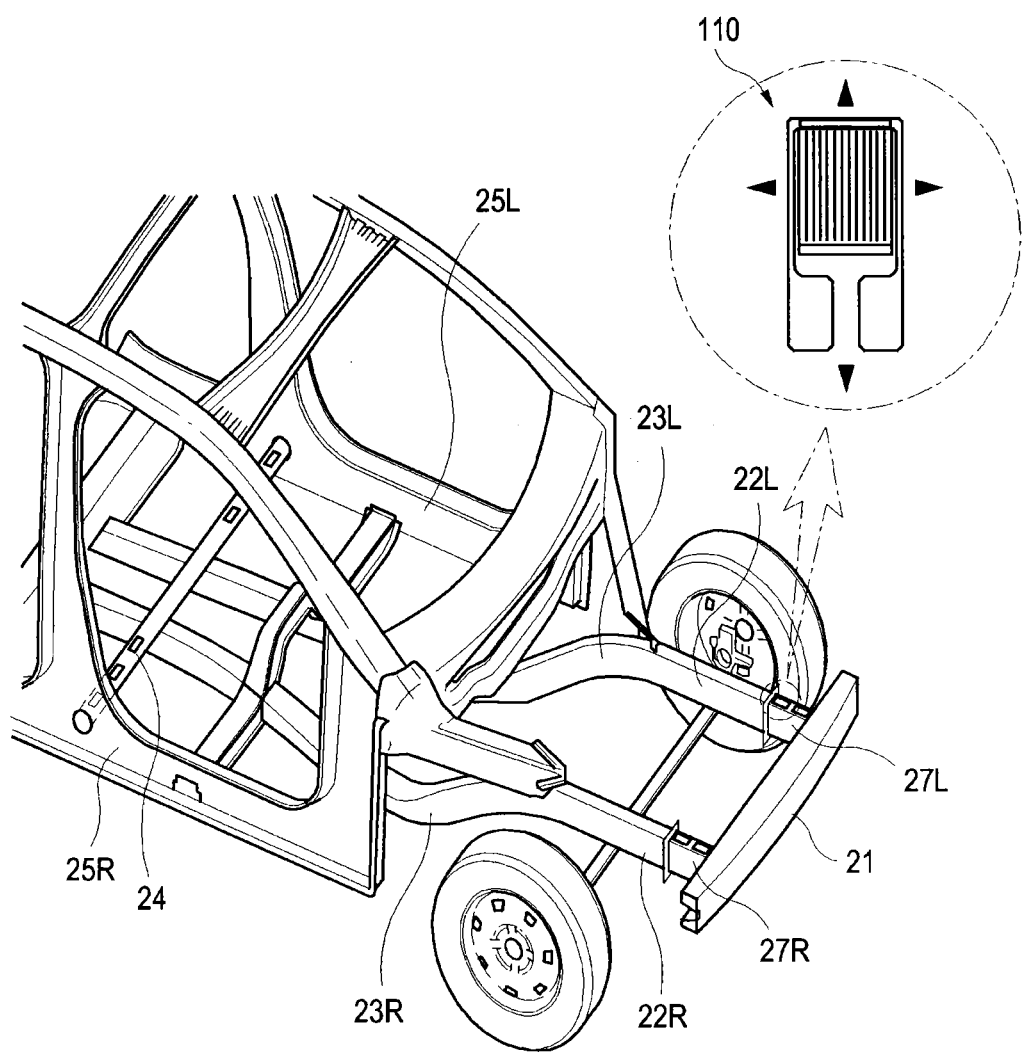
Figure 6:
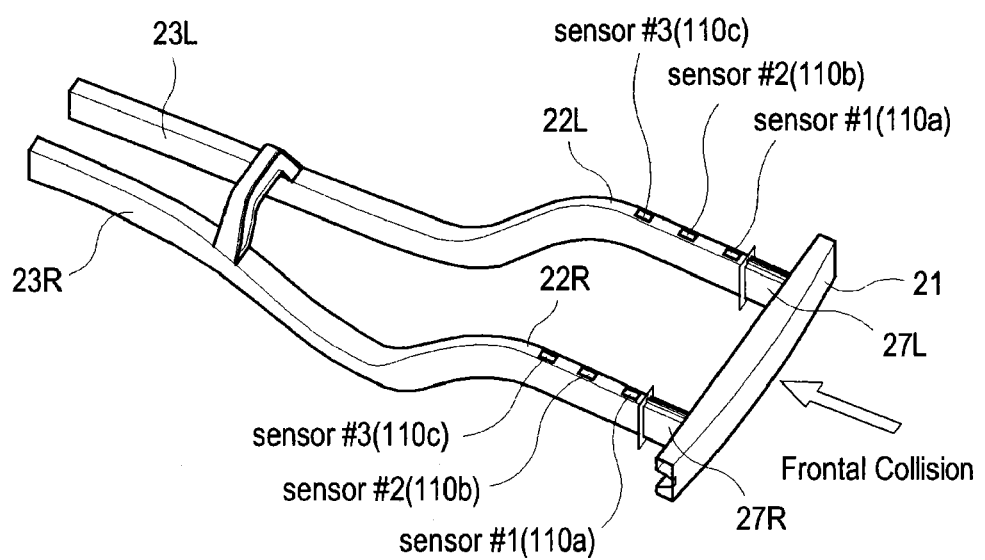
FIGS. 6 to 8 are schematic diagrams showing each part of the vehicle frame on which the sensors are mounted as shown in FIGS. 4 and 5.
Figure 7:
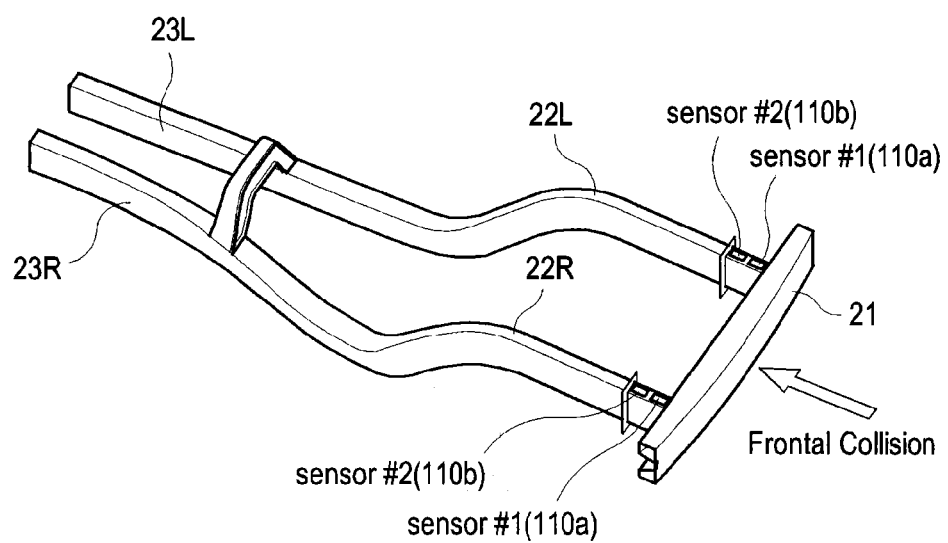
Figure 8:
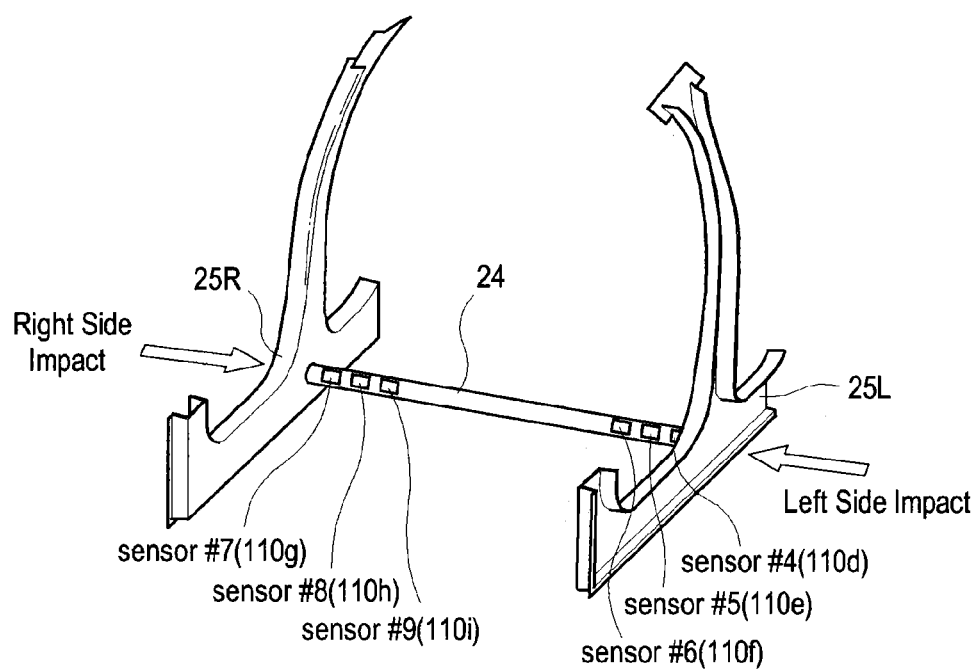

FIGS. 4 and 5 are schematic diagrams showing the sensors and the frame members of the vehicle frame on which the sensors are mounted, respectively. FIGS. 6 to 8 are schematic diagrams showing each frame member of the vehicle frame on which the sensors are mounted as shown in FIGS. 4 and 5. In these drawings, the strain gauge sensor is shown as one example of the sensor. Further, the ECU, the inflators and the airbags are omitted for ease of description.

Referring to FIGS. 4 to 7, the sensors 110 that can be used for detecting a frontal collision may be mounted on front-side members 22R and 22L (see FIGS. 4 and 6) or crash boxes 27R and 27L (see FIGS. 5 and 7), which join the front-side frame members 22R and 22L and a bumper 21. As shown in FIGS. 4 and 6, three sensors 110a, 110b and 110c may be mounted on the front-side member 22R or 22L at predetermined intervals in the extension direction of the front-side member 22R or 22L, which also becomes the propagation path of the stress waves without dispersion. Further, as shown in FIGS. 5 and 7, two sensors 110a and 110b may be mounted on the crash box 27R or 27L and placed apart from each other.

When the frontal collision occurs, the stress waves begin at the bumper 21 and then propagate through the crash box 27R or 27L, the front-side member 22R or 22L and a front-rail member 23R or 23L. At this time, since the sensors 110a, 110b and 110c are mounted on the front-side member 22R or 22L or the crash box 27R or 27L at predetermined intervals along the propagation path of the stress waves, the stress waves are measured sequentially according to time by each sensor as they propagate from the bumper 21 through the crash box 27R or 27L or the front-side member 22R or 22L.

Each sensor 110a, 110b, 110c outputs its own measurement value (e.g., voltage) to the ECU 120. The ECU 120 monitors all outputs from the sensors and examines whether all outputs from the sensors 110a, 110b and 110c exceed a predetermined threshold. This may be preset as a criterion for determining the deployment of the airbag 140 (i.e., frontal airbag 141 or side airbag 142) and may be programmed into the ECU 120. In case all the outputs exceed the threshold, the ECU determines the deployment of the airbag 140 (e.g., frontal airbag 141) and then outputs the actuation signal to the inflator 131. Further, the ECU 120 determines the deployment of the airbag 140 when the outputs from the sensors are inputted to the ECU 120 in order along the propagation path of the stress waves relating to the frontal collision (i.e., when the output from the sensor 110a is first inputted and the output from the sensor 110b is then inputted and the output from the sensor 110c is finally inputted). Then, the inflator 131 generates gas and supplies it to the frontal airbag 141. Consequently, the frontal airbag 141 is deployed right after the frontal collision.

Referring now to FIGS. 4, 5 and 8, the sensors 110 for detecting a side impact may be mounted on a cross-support member 24, which joins a pair of rocker members 25R and 25L. As shown in FIGS. 4, 5 and 8, three sensors 110d, 110e and 110f may be mounted on the cross-support member 24 in the left side thereof at predetermined intervals in the extension direction thereof, which also becomes the propagating path of the stress waves without dispersion in the event of the left side impact. Also, three sensors 110g, 110h and 110i may be mounted on the cross-support member 24 in the right side thereof at predetermined intervals in the extension direction thereof, which also becomes the propagating path of the stress waves without dispersion in the event of the right side impact.

When the left side impact occurs, the stress waves begin at the rocker member 25L and then propagate through the cross-support member 24. At this time, since the sensors 110d, 110e and 110f are mounted on the cross-support member 24 at predetermined intervals, the stress waves are measured sequentially according to time by each sensor 110d, 110e and 110f. The ECU 120 outputs the actuation signal to the inflator 130 only when all the outputs from the sensors 110d, 110e and 110f are beyond the predetermined threshold and the outputs are inputted in order of the sensors 110d, 110e and 110f along the propagation path of the stress waves relating to the left side impact. Consequently, the airbag 140 (i.e., side airbag 142 associated with the left side impact) can be deployed by actuation of the inflator 132. In case of the right side impact, the airbag 140 (i.e., side airbag 142 associated with the right side impact) can be deployed in the same manner as the left side impact.

As described above, the stress waves are measured sequentially at predetermined time intervals since the sensors 110 are positioned at the predetermined intervals along each propagation path of the stress waves, which is generated by the frontal collision, the left side impact or the right side impact. Also, the ECU 120 determines the deployment of the airbag 140 only when the outputs from the sensors are inputted in order of the sensors along the respective propagation paths of the stress waves relating to the frontal collision and the right or left side impact. Therefore, when the outputs from the sensors 10 are inputted in an overlapping manner or not sequentially (e.g., when the automobile travels over a road hump or a speed bump), the ECU 120 does not output the actuation signal.

While the above-described sensors are directly mounted on the frame member of the vehicle frame, the sensors may be equipped in a modular manner. In such a case, the works associated with mounting, repairing and replacing the sensors become easier and the measurement of the stress waves can be effectuated without error.

Figure 9:
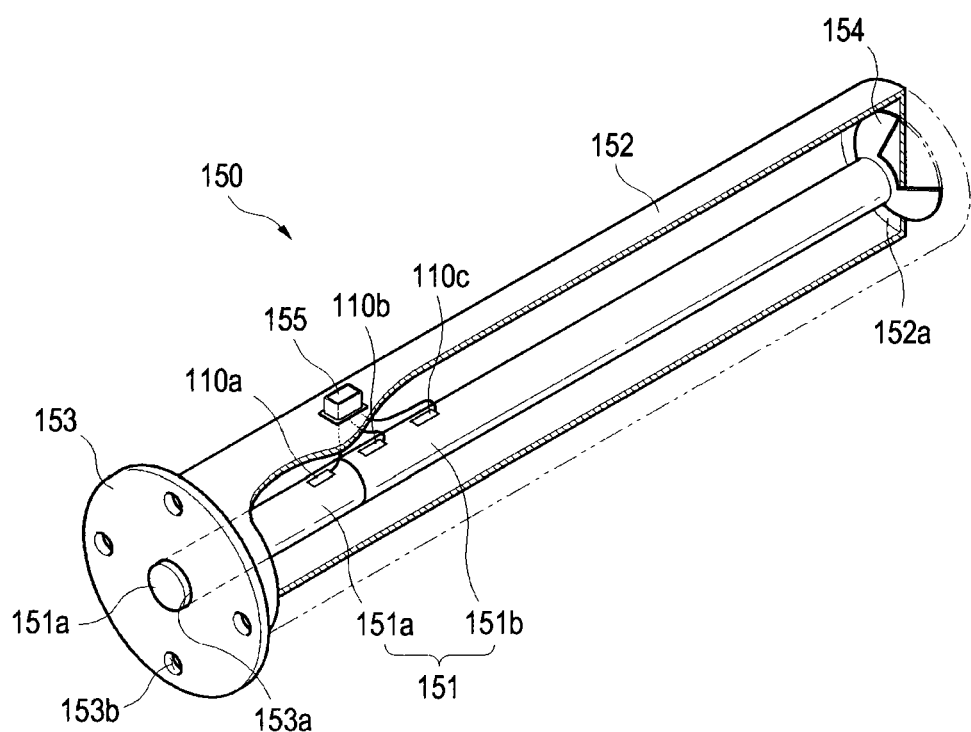
FIG. 9 is a partial cutaway perspective view of a sensor module.
Figure 10:
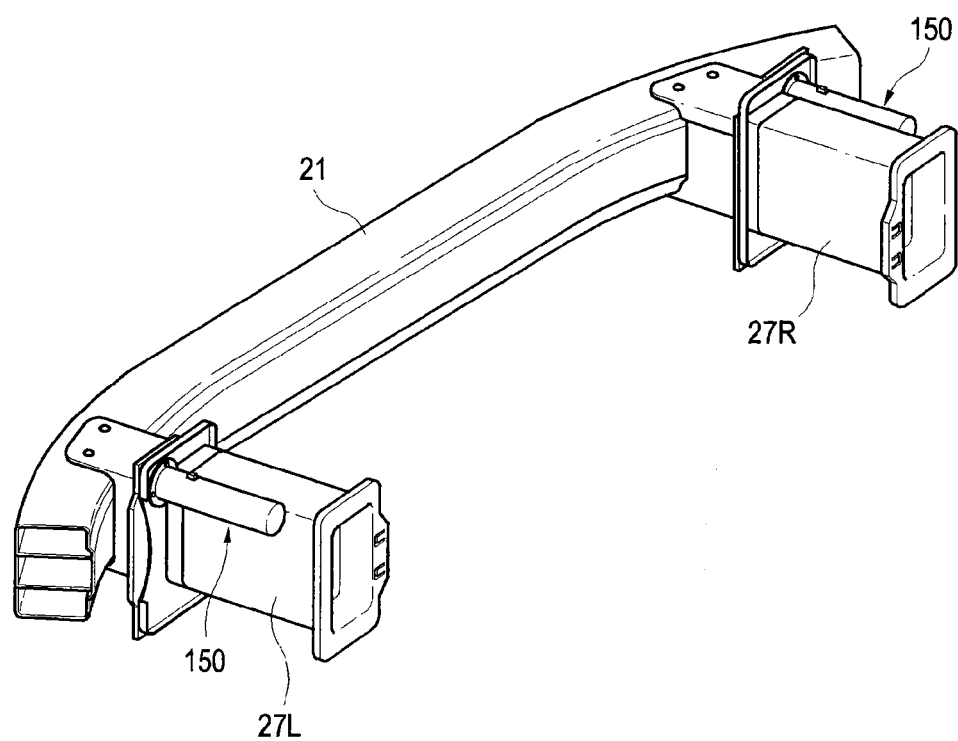
FIG. 10 is a schematic diagram illustrating a sensor module, which is mounted on one of the frame members of the vehicle frame.

The airbag system according to the present invention further comprises a sensor module that is mountable upon the frame member and equipped with two or more sensors. FIG. 9 is a partial cutaway perspective view of the sensor module. FIG. 10 is a schematic diagram illustrating the sensor module, which is mounted upon one of the frame members of the vehicle frame.

Referring to FIG. 9, the sensor module 150 includes: a rod member 151 configured to contact the frame member, through which the stress waves propagate, at one end and receives the stress waves from the frame member; a cylindrical case 152 for receiving and supporting the rod member 151; and a flange 153 formed on the case 152 for securing the sensor module 150 to the frame member.

One end of the case 152 is formed with the flange 153 while the other end of the case 152 is closed. The flange 153 has a through-hole 153a near its center, through which one end of the rod member 151 is protruded out slightly, and has through-holes 153b for bolt-securing at the outside thereof. Two or more sensors 110a to 110c are mounted upon the rod member 151 along the lengthwise direction thereof. A connector 155 is provided on the case 152 and is connected to the sensors 110a to 110c via electric wires. The sensor module 150 may be connected to the ECU 120 by engaging the connector 155 and its counterpart connector (not shown), which is connected to the ECU 120 of the airbag system 100.

The length of the rod member 151 is determined so that one end of the rod member 151 protrudes out slightly through the through-hole 153a. Accordingly, when the sensor module 150 is closely contacted to the frame member by bolt-securing, the rod member 151 is biased toward the frame member due to a counteraction from bolt-securing. Thus, the close contact is effectuated between the frame member and the one end of the rod member 151.

The rod member 151 includes a first rod 151a that may be brought into contact with the frame member and a second rod 151b, which is interposed between the first rod 151a and the inner surface 152a of the other end of the case 152. One 110a of the sensors is mounted on the first rod 151a, while the rest 110b and 110c is mounted on the second rod 151b.

As described above, since the rod member 151 is divided into the first and second rods 151a and 151b, the discontinuous propagation occurs when the stress waves go through an interface between the first and second rods 151a and 151b. Therefore, the output from the sensor 110a mounted on the first rod 151a and the outputs from the sensors 110b and 110c mounted on the second rod 151b can be outputted discriminatively and definitely, thereby preventing the outputs from overlapping each other. Further, since the first rod 151a of the rod member is brought into contact with the frame member while being biased toward the frame member after the sensor module 150 is mounted thereto, the stress waves can be transferred to the first rod 151a without any disturbance.

The sensor module 150 further includes a bias member 154 for increasing a force, which biases the rod member 151 toward the frame member. The bias member 154 is disposed between the other end of the rod member 151 (more specifically, the other end of the second rod 151b) and the inner surface 152a of the other end of the case 152, thereby biasing the rod member 151 toward the frame member. A disc spring (shown in FIG. 9) or a compression spring may be employed as the bias member 154. The force, which biases the rod member 151 toward the frame member, can be variously selected by adjusting a compressive force of the disc spring or the compression spring according to the type of automobile. Therefore, the stress waves can be transferred to the rod member 151 without any disturbance irrespective of the type of automobile.

Such sensor module 150 may be mounted on a flange between the crash box 27R or 27L and the front-side member 22R or 22L, or the rocker member 25R or 25L. Further, the sensor module 150 may be mounted on a flange of the crash box 27R or 27L for purposes of detecting the frontal collision and an offset collision, as shown in FIG. 10.

Referring to FIG. 10, the sensor module 150 is mounted to the flange of the crash box. At this time, the first rod 151a is brought into contact with the flange of the crash box 27R or 27L, while being biased toward the flange of the crash box. Therefore, the stress waves, which are caused by the frontal or offset collision, propagate from the bumper 21 via the flange of the crash box to the first and second rods 151a and 151b. Since the sensors 110a to 110c are mounted to the rod member 151 at predetermined intervals, the stress waves are measured sequentially at predetermined time intervals by each sensor.

Figure 11:
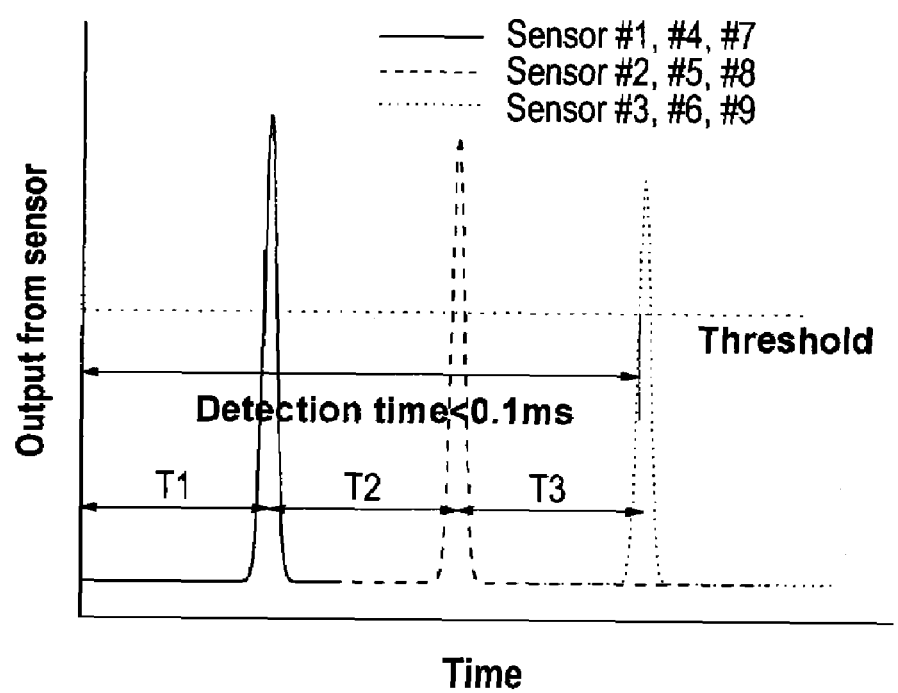
FIG. 11 is a graph showing outputs from the sensor shown in FIGS. 6 and 8, which are measured sequentially according to time.
Figure 12:
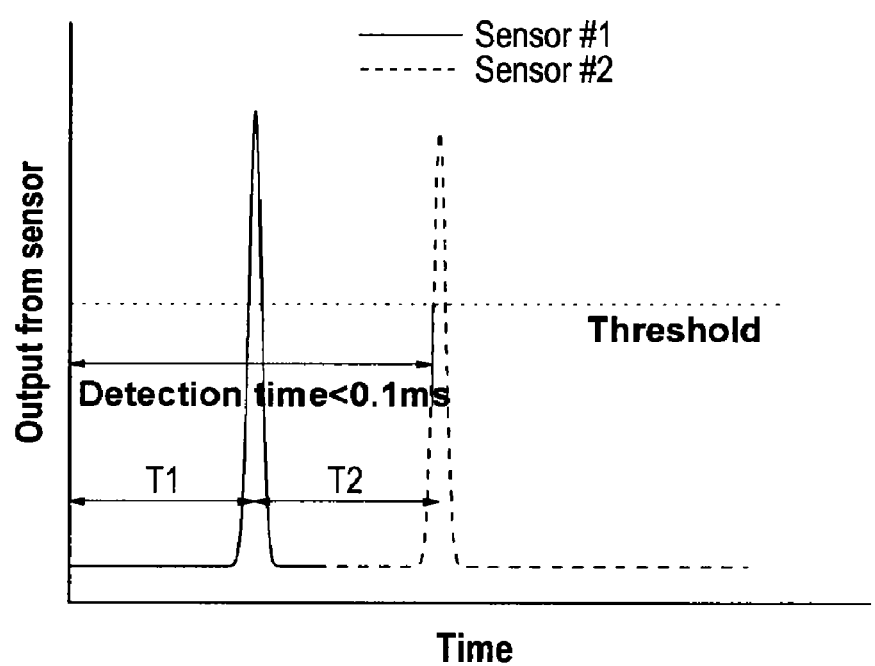
FIG. 12 is a graph showing outputs from the sensor shown in FIG. 7, which are measured sequentially according to time.

FIGS. 11 and 12 show the outputs from the sensors measured sequentially according to time by the sensors 110 shown in FIGS. 6, 7 and 8.

In FIGS. 11 and 12, T1 indicates a time interval between a point of time of the crash and a point of time of the measurement at a first sensor (sensor #1, sensor #4 and sensor #7). T2 indicates a time interval between the point of time of the measurement at the first sensor and a point of time of the measurement at the second sensor (sensor #2, sensor #5 and sensor #8). T3 indicates a time interval between the point of time of the measurement at the second sensor and a point of time of the measurement at the third sensor (sensor #3, sensor #6 and sensor #9). The time interval T1 may depend on a distance between the collision or impact point and the first sensor. The time intervals T2 and T3 may depend on the distances between the respective sensors. Preferably, the above-mentioned distances are predetermined such that the sum of the time intervals T1, T2 and T3 is within 0.1 ms or a desired time limit suitable for starting the deployment of the airbag.

In general, it is known that stress waves propagate through a metallic plate, which is usable for a vehicle frame, at a rate of approximately 5000 mn/s. Therefore, when a distance between a collision or impact point (i.e., the bumper 21 or the rocker members 25R and 25L) and the sensor positioned farthest therefrom may be set within 0.5 m, the airbag system according to the present invention can detect whether or not the frontal collision or the side impact occurs within 0.1 ms.

In the sensor module 150, the rod member 151 may have a length of less than 0.5 m for purposes of miniaturization. However, since the rod member 151 are divided into two parts, the outputs from the sensors can be obtained discriminately and nonoverlappingly as described above. Since the first rod 151a has a limited length, the shorter the length of the first rod 115a is, the shorter the time required for measuring the stress waves passing therethrough will be. Also, the time intervals between the points of time of the measurement at the respective sensors depend on the distances between the sensors. Therefore, although the length of the rod member 151 is less than 0.5 m, it is possible to detect the crash within 0.1 ms using the sensor module 150 by adjusting the length of the first rod 151a and the distances between the sensors mounted on the second rod 151b.

As such, when the frontal collision or the side impact, the magnitude of which is sufficiently high for the frontal or side airbag 141 or 142 to be deployed, actually occurs, the outputs from all the sensors are inputted to the ECU 120 within 0.1 ms or less. Then, the ECU 120 monitors the outputs and determines whether to deploy the airbag 141 or 142. In case the outputs from the sensors are inputted in order of the sensors along the respective propagation paths of the stress waves and all of them exceed the threshold, the ECU 120 determines that the airbag 141 or 142 must be deployed. Thereafter, the ECU 120 outputs the actuation signal to the inflator 131 or 132 corresponding to the detected crash. Finally, the airbag 141 or 142, which corresponds to the detected crash, is deployed by the actuation of the inflator 131 or 132.

Accordingly, the airbag system according to the present invention can reduce the detection time required for detecting the occurrence of the frontal collision or the side impact within approximately 0.1 ms, thereby deploying the airbag earlier than a prior art airbag system having a detection time of 10~20 ms.

Embodiments of the present invention may provide an airbag system for an automobile and a method of operating the same. The airbag system of the present invention can remarkably reduce the detection time required for detecting a crash by measuring the stress waves propagating through the vehicle frame, thereby deploying an airbag in a timely manner while ensuring the safety of a driver or passengers.

An airbag system for an automobile may be provided. The airbag system of the present invention may comprise sensors for detecting a crash, an electronic control unit, an inflator and an airbag. The sensor may be configured to measure stress waves caused by the crash and be mounted on a frame member of a vehicle frame. The electronic control unit may output an actuation signal based on outputs from the sensors. The inflator may generate a gas in response to the actuation signal. The airbag may be operatively coupled to the inflator and be deployed by supply of the gas generated from the inflator. The sensors may be mounted on the frame member at predetermined intervals in a path, along which the stress waves propagate through the frame member. The electronic control unit may output the actuation signal when each output from each sensor exceeds a predetermined threshold.

A method of operating an airbag system for an automobile may also be provided. The airbag system may include: sensors for detecting a crash by measuring stress waves; an electronic control unit for monitoring outputs from the sensors; an inflator actuatable by the electronic control unit; and an airbag deployable by the inflator. According to the method of the present invention, the stress waves, which are generated by the crash and propagate through a vehicle frame, may be measured using the sensors. Based on the outputs from the sensors, it may be determined at the electronic control unit whether to deploy the airbag. The inflator may be actuated when it is determined that the airbag is deployed.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An airbag system for an automobile, comprising:
    two or more sensors mounted on a frame member of a vehicle frame for detecting a crash by sequentially measuring stress waves caused by the crash;
    an electronic control unit for outputting an actuation signal based on outputs from the sensors;
    an inflator for generating gas in response to the actuation signal; and
    an airbag operatively coupled to the inflator and being deployed by supply of the gas generated from the inflator;
    wherein the sensors are mounted on the frame member at predetermined intervals in a path, along which the stress waves propagate though the frame member, and wherein the electronic control unit outputs the actuation signal when each output from each sensor exceeds a predetermined threshold and the outputs from the sensors are inputted in order along the path.

2. The airbag system of claim 1, wherein the airbag system further comprises a sensor module for attaching the two or more sensors therein and being mountable to the frame member,
    wherein the sensor module includes a rod member configured to receive the stress waves by contacting the frame member and a case for supporting the rod member and being mounted to the frame member,
    wherein the sensors are mounted on the rod member at predetermined intervals in the lengthwise direction thereof, and
    wherein the sensor module is secured to the frame member such that one end of the rod member is configured to contact the frame member by making the rod member slightly longer than the case.

3. The airbag system of claim 2, wherein the rod member includes a first rod configured to contact the frame member and a second rod interposed between the first rod and the case,
    wherein one of the sensors is mounted on the first rod and the remaining sensors are mounted on the second rod, and
    wherein the sensor module further includes a bias member disposed between the second rod and the ease for biasing the first and second rods toward the frame member.

4. The airbag system of claim 1, wherein the sensor includes a strain gauge sensor or a piezoelectric sensor.

5. The airbag system of claim l, wherein the frame member is a front-side member, a cross-support member or a crash box of the vehicle frame.

6. A method of operating an airbag system for an automobile, which includes sensors for detecting a crash by measuring stress waves, an electronic control unit for monitoring outputs from the sensors, an inflator actuatable by the electronic control unit, and an airbag deployable by the inflator, the method comprising:
    measuring the stress waves generated by the crash and propagating through a vehicle frame using the sensors;
    determining whether to deploy the airbag at the electronic control unit based on the outputs from the sensors; and
    actuating the inflator when it is determined that the airbag is deployed,
    wherein measuring the stress waves includes measuring the stress waves sequentially at predetermined time intervals along a path, along which the stress waves propagate after being generated by the crash, and wherein determining whether to deploy the airbag includes determining a deployment of the airbag only when the outputs from the sensors are inputted in order along the path and exceed a predetermined threshold.

* * * * *